United States Patent [19]

Kyoden et al.

[11] Patent Number: 4,751,204
[45] Date of Patent: Jun. 14, 1988

[54] TWO-PART GUNNING REFRACTORY COMPOSITION

[75] Inventors: Hiroshi Kyoden, Okayama; Kenji Ichikawa, Bizen; Yoshihisa Hamazaki, Okayama, all of Japan

[73] Assignee: Shinagawa Refractories Co., Ltd., Tokyo, Japan

[21] Appl. No.: 787,320

[22] Filed: Oct. 15, 1985

[30] Foreign Application Priority Data

Oct. 22, 1984 [JP] Japan ................................ 59-220623

[51] Int. Cl.$^4$ ...................... C04B 35/02; C04B 35/10; C04B 35/14
[52] U.S. Cl. ........................................ 501/89; 501/90; 501/92; 501/94; 501/124; 264/30
[58] Field of Search ...................... 501/89, 90, 94, 124; 264/30

[56] References Cited

U.S. PATENT DOCUMENTS

| | | | |
|---|---|---|---|
| 4,061,501 | 12/1977 | Ivarsson et al. | 501/89 |
| 4,218,254 | 8/1980 | Kiehl et al. | 501/89 |
| 4,222,782 | 9/1980 | Alliegro et al. | 501/105 |
| 4,244,745 | 1/1981 | Havranek et al. | 501/124 |
| 4,298,391 | 11/1981 | Hayase et al. | 501/89 |
| 4,331,773 | 5/1982 | Hongo et al. | 501/89 |

FOREIGN PATENT DOCUMENTS

| | | | |
|---|---|---|---|
| 51-9770 | 3/1976 | Japan . | |
| 52-76313 | 6/1977 | Japan | 501/89 |
| 52-138002 | 11/1977 | Japan . | |
| 55-15948 | 2/1980 | Japan . | |
| 58-2270 | 1/1983 | Japan | 501/89 |

OTHER PUBLICATIONS

Naruse, Y. et al., Journal entitled "Taikabutsu (Refractory)", vol. 33, (1981), pp. 22–24.

Primary Examiner—William R. Dixon, Jr.
Assistant Examiner—A. Knab
Attorney, Agent, or Firm—Burns, Doane, Swecker & Mathis

[57] ABSTRACT

The present invention relates to a two-part gunning refractory composition wherein fine powders of a refractory aggregate and superfine refractory powders are previously made into the form of a slurry containing therein a deflocculant, thereby reducing the amount of aluminous cement and also reducing the amount of water to achieve a deposit applied by gunning having a quality comparable to one produced by casting.

12 Claims, No Drawings

TWO-PART GUNNING REFRACTORY COMPOSITION

BACKGROUND OF THE INVENTION

The present invention relates to a gunning refractory composition for use in lining troughs of blast furnaces or vessels for receiving molten pig iron, and more particularly it relates to a refractory composition for use in gunning having high adhesion ability, high strength, low porosity, and high corrosion resistance.

Heretofore, the lining of the troughs of blast furnaces and vessels for molten pig iron was formed using refractory bricks or an monolithic refractory applied by stamping, casting, vibration molding and the like. Recently, however, casting has become the predominant technique for the lining of troughs of blast furnaces in order to reduce labor and costs and to improve working conditions.

A casting material is composed of a castable refractory composition containing 15 to 25% by weight of conventional alumina cement. This castable refractory composition has drawbacks such as rupturing on rapid drying as the result of rapid dehydration of the alumina cement, poor strength in an intermediate temperature region, the reduction of resistance to slag, and the reduction of hot strength due to the presence of CaO in the alumina cement. These drawbacks, however, are substantially alleviated by employing a low cement castable refractory or an alumina cement free castable refractory in which superfine refractory powders and a deflocculant are used, while the amount of alumina cement to be used is made as small as possible, and the above-mentioned castable refractories, hereinafter referred to as low cement castable refractories, can be used without any problems from the standpoint of durability.

However, casting requires blending on-site of component materials by a large mixer and framing operations which are quite troublesome. It has other drawbacks such as a long curing period at the end of which the frame disengages and also a long drying period. Thus, casting is not yet a satisfactory application technique.

Gunning is preferable to casting as a technique for applying linings to troughs and vessels for molten pig iron, because it does not require on-site blending and framing. Thus, it permits reductions in labor and equipment costs and can be effectively used in repairing local damage to lining by cold or hot gunning.

In the case of conventional gunning operation effected by blending water and a powdery gunning material at the nozzle of a spray gun, the powdery gunning material being transferred by pressure to the nozzle, the water content is rather high (10-20% by weight of the total weight of blended water and powdery material.) This produces a lower adhesion ratio and a lower packed density of the adhered material than for a cast material containing 4-8% by weight of water, resulting in lower durability. For this reason, at present, gunning is used only for repairing local damage to linings. Therefore, many efforts have been made in order to reduce the water content of gunning refractory compositions, and extensive investigations have been made concerning the grain size of the particles in the particulate component, the selection of an effective binder for gunning refractory compositions, the nozzle shape of the spray gun, and the like. However, in spite of these efforts and investigations, a satisfactory gunning refractory composition has yet to be achieved. For example, the mere addition of a deflocculant to the gunning refractory composition is insufficient, since it require at least 3-5 seconds to deflocculate superfine refractory powders. This is too long, for it takes less than 1 second for the gunning refractory composition to reach the target surface to be coated starting from the point when water is mixed with a powdery composition, and thus sufficient deflocculation cannot be achieved.

The present inventors have discovered that a low cement castable refractory composition containing a very low alumina cement, superfine powders and a deflocculant in combination and having a low water content can be successfully used as a gunning composition in order to obtain a lining of high packed density if a fine powder portion comprising a portion of fine powders of a refractory aggregate separated from a coarse/fine grain portions of the refractory aggregate, superfine refractory powders and a deflocculant are together slurried and if the resulting slurry is used in place of water of the conventional spray coating composition. Thus the slurry is mixed at a nozzle of spray gun with the remaining coarse/fine grains of refractory aggregate.

SUMMARY OF THE INVENTION

The object of the present invention is to provide a two-part gunning refractory composition providing a lining having a high quality which is comparable to one resulting from casting installation with regards to its packed density.

Thus the present invention relates to an improved two-part gunning refractory composition for use in lining molten pig-iron receiving troughs and vessels comprising a refractory raw material comprising 84-98% by weight of a refractory aggregate consisting of coarse/fine grains and fine powders, 12-2% by weight of superfine refractory powders having a particles size of at most 10μ, and 4-0% by weight of alumina cement, a deflocculant and water and/or colloidal silica, the improvement being in that the gunning refractory composition comprises a first-part (Part A) composed of coarse/fine grains of a refractory aggregate to which is admixed 0.05-0.5% by weight per 100 weight % of the refractory raw material, of a hardening accelerator, and a second part (Part B) which is a slurry composed of the remaining refractory aggregate fine powders, superfine refractory powders, 0.01-0.5% by weight per 100 weight % of the refractory raw material, of a deflocculant, and 4-10% by weight per 100 weight % of the refractory raw material, of water and/or colloidal silica, the alumina cement being incorporated in Part A and/or Part B.

The present invention also contemplate to provide a process for lining the miner surface of troughs or vessels for molten pig iron by gunning above refractory compositions.

DETAILED DESCRIPTION OF THE INVENTION

A more detailed explanation of the present invention will be given hereinafter.

The refractory composition suitable for use in the form of gunning composition consists of a part composed of coarse/fine grains of refractory aggregate and a part composed of fine powders in the form of a slurry (hereinafter referred to as a slurry part).

The refractory aggregate employable in accordance with the present invention comprises a major part of at least one oxide raw material selected from alumina, alumina/magnesia-type spinel, high alumina, chamotte, agalmatolite, silica and the like and a minor part of at least one non-oxide raw material selected from silicon carbide, silicon nitride, ferro-silicon nitride, carbon, pitch, metallic Si, metallic Al, boron carbide, and the like. The amount of refractory aggregate to be incorporated in the refractory raw material ranges from 84 to 98% by weight per 100% by weight of the refractory raw material. The particle size of coarse/ fine grains is greater than 74 $\mu$m and preferable 0.3–5 mm. The coarse/fine grains herein referred to mean those having a particle size of larger than 74 $\mu$m as explained hereinafter.

To the coarse/fine grains of refractory aggregate there is added a hardening accelerator such as a sulfate such as sodium sulfate, potassium sulfate, calcium sulfate, a nitrate such as sodium nitrate, potassium nitrate, a carbonate such as $Na_2CO_3$, $K_2CO_3$ and $Li_2CO_3$, a silicate such as sodium silicate and potassium silicate, $Ca(OH)_2$, or the like. One or more of these hardening accelerators is used in an amount of 0.05–0.5% by weight per 100% by weight of the refractory raw material. It is possible to add all or a portion of the alumina cement to the coarse/fine grain part. The kind and the amount of hardening accelerator may be adjusted depending on the time or season to be employed and the thickness of the applied material. A minute amount of water can be added in order to prevent dust.

The slurry part consists of fine powders comprising a mixture of the remaining refractory aggregate fine powders, a deflocculant, and superfine refractory powders, optionally incorporating therein alumina cement, and 4–10% by weight, per 100% by weight of the refractory raw material, of water or collidal silica or a mixture of water and colloidal silica in order to form the slurry. The viscosity of the slurry should preferably be at most 1500 centi-poises (cP). The grain size of the fine powders used in the slurry part of the present invention corresponding to that of the fine powder portion of a conventional castable refractory. However, until the present invention, no one ever proposed separation of the fine powder portion from the coarse grain portion and incorporating it in a slurry. The particle size of the fine powder in the slurry part is determined by the viscosity of the slurry resulting from the deflocculating effect of a mixture of refractory aggregate and superfine refractory powders and the optimum spraying conditions such as the pore diameter of the spraying nozzle and the pressure applied to the conduit of the gunning equipment. As a result of extensive experiments, the particle size of the fine powder portion has been determined to be preferably at most 74 $\mu$m. The superfine refractory powders should have a particle size of at most 10 $\mu$m and preferably at most 1 $\mu$m. They are selected from clay, kaoline, silica flour produced as a by-product of the production of ferro-silicon and metasilicon, hydrated silica, carbon black, silica formed in a gas-phase process, alumina, titanium oxide, and calcined alumina. One or more of these superfine refractory powders can be employed. The superfine refractory powders should constitute 2–12% by weight of the refractory raw materials. If the amount of superfine refractory powders is less than 2% by weight, no sufficient water reduction effect can be achieved, while if it is in excess of 12% by weight, shrinkage of the applied material after heating increases, which is undesirable. The particle size of superfine refractory powders should be at most 10 $\mu$m and preferably at most 1 $\mu$m. If the particle size is greater than 10 $\mu$m the water reduction effect achievable in combination with the deflocculant becomes smaller. With a particle size of 1 $\mu$m or smaller, the water reduction effect becomes remarkable.

As the aluminous cement there may preferably be used one or more of ALCOA CA-25 (trade name of a cement produced by ALCOA, Denka High Alumina Cement Super (trade name of a cement produced by Denka Co. Japan), CECAL 250 (trade name of a cement produced by Lafarge Fondu International), JIS. No. 1 and No. 2 aluminous cements, or calcium aluminate which constitute the above-mentioned aluminous cement. The total amount of the aluminous cement to be employed should be 4.0–0% by weight of the refractory raw material. If the amount of aluminous cement is greater than 4% by weight, the corrosion resistance and hopping resistance will decrease.

Since the aluminous cement provides, when it is made into a slurry, an extensively varying viscosity upon hydration, it may be added either to the coarse/fine grains portion (Part A) or to the slurry (Part B) or to both of them depending upon the application.

As to the deflocculant, there may be preferably employed one or more of a formaldehyde adduct of naphthalene sulfonic acid, lignin sulfonate salts, sodium phosphate, and the like. The total amount of deflocculants to be employed should be 0.01–0.5% by weight per 100% by weight of refractory raw material. If the amount of deflocculant is less than 0.01% by weight, adequate dispersion effect cannot be achieved, while if it exceeds 0.5% by weight, the optimum dispersion effect is not attained.

Finally, the weight ratio of coarse/fine grains (Part A)/slurry (Part B) is preferably 60/40 to 72/25.

The following examples will illustrate the present invention more concretely, but it should be noted that the scope of the present invention is not limited to these examples.

EXAMPLE 1

A two-part gunning refractory composition was prepared comprising a coarse/fine grain part (Part A) which contained 0.15% by weight of calcium hydroxide as a hardening accelerator in addition to the components indicated in Table 1, and a slurry part (Part B) which contained the components indicated in Table 1, with which was admixed 0.1% by weight of sodium condensed phosphate having a ph of 5.5 as a deflocculant. The resulting coarse/fine grain part (Part A) and the slurry (Part B) were mixed at the nozzle portion of a continuously operating gun which delivered 70 kg/min. at a line pressure of 3 kg/cm$^2$ for Part A and at a line pressure of 6 kg/cm$^2$ for Part B and sprayed applied by gunning to the surface of agalmatolite bricks kept at ordinary temperature, 600° C., 800° C., and 1000° C. The quality of the resulting deposit was examined.

Separately, a conventional gunning refractory composition composed of the same raw materials as above except that sodium silicate or aluminous cement was used as a binder and that no slurry part was used was coated by gunning using the same conditions as above.

The results are shown in Table 2.

TABLE 1

|  | Example 1 % by weight |
|---|---|
| Coarse/fine grain part (Part A) |  |
| Sintered alumina (6–48 mesh) | 67.7 |
| pitch pellets | 1 |
| high aluminous cement | 4 |
| metallic aluminium powder | 0.3 |
| calcium hydroxide | +0.15 |
| Slurry part (Part B) |  |
| silicon carbide (at most 200 mesh) | 18 |
| calcined alumina (at most 10 μm) | 7 |
| clay | 2 |
| sodium condensed phosphate (pH 5.5) | +0.05 |
| water | +6 |

|  | Comp. Ex. 1 | Comp. Ex. 2 | Comp. Ex. 3 |
|---|---|---|---|
| sintered alumina (6–48 mesh) | 67 | 74 | 67.7 |
| silicon carbide (at most 200 mesh) | 15 | 15 | 18 |
| calcined alumina (at most 10 μm) | 7 | 7 | 7 |
| clay | — | — | 2 |
| pitch pellets | 1 | 1 | 1 |
| high aluminous cement | 10 | — | 4 |
| powdery sodium silicate No. 3 | — | 3 | — |
| aluminium phosphate | — | +0.5 | — |
| metallic aluminium powder | — | — | 0.3 |
| sodim condensed phosphate (pH 5.5) | — | — | +0.1 |
| calcium hydroxide | — | — | +0.15 |

Note: The symbol "+" indicates "% by weight" per total weight of the other components having no "+" symbol. Hereinafter the "+" symbol has the same meaning.

TABLE 2

|  | Ex. 1 | Comp. Ex. 1 | Comp. Ex. 2 | Comp. Ex. 3 |
|---|---|---|---|---|
| Application Technique | gunning | gunning | gunning | casting |
| Adhesion ratio (%) |  |  |  |  |
| at ordinary temp. | 95 | 90 | 90 | — |
| at 600° C. | 95 | 55 | 85 | — |
| at 800° C. | 90 | 30 | 85 | — |
| at 1000° C. | 85 | 25 | 75 | — |
| Properties of the deposit |  |  |  |  |
| apparent porosity (%) after gunning at ordinary temp. and burning at 1000° C. for 3 hrs. | 20.3 | 31.3 | 29.3 | 20.2 |
| Crushing strength Kg/cm² after burning at 1000° C. for 3 hours | 350 | 68 | 75 | 420 |
| amount of water (%) required for application at ordinary temp. | 6.0 | 15.0 | 11.0 | 5.5 |

As is apparent from Table 2, Comparative Example 1 in which an aluminous cement was used as a binder showed a good adhesion ratio at ordinary temperatures, but the adhesion ratio rapidly decreased at higher temperatures. Comparative Example 2 in which sodium silicate was used as a binder showed a similar adhesion ration to Example 1 of the present invention in which a 2-part refractory composition is used, but the Comparative Examples require much more water for gunning and the physical properties of the burned deposit such as the crushing strength and porosity are poor. It should be noted that Example 1 provides substantially the same quality of deposit as comparative Example 3, which had approximately the same refractory composition as Example 1 but which was applied by casting instead of gunning. Thus, the present invention can provide a high quality deposit equal in quality to a cast deposit but without the drawbacks of casting.

EXAMPLE 2

A two-part gunning refractory composition was prepared by mixing a coarse/fine grain part as shown in Table 3 with 0.1% by weight, on the basis of the refractory raw material, of anhydrous sodium metasilicate to from Part A and mixing fine/superfine powders as shown in Table 3 with 0.1% by weight of sodium tetrapolyphosphate as a deflocculant, 4% by weight of colloidal silica (20% of solid $SiO_2$), and 3.5% by weight of water per 100 weight % of refractory raw material, to a form slurry part (Part B). The resulting composition was coated by gunning onto the surface of agalmatolite bricks using a continuous spray gun at the nozzle portion of which Part A and Part B were mixed. The gunning conditions were a rate of 70 kg/min, and a line pressure of 3 kg/cm² for Part A and a line pressure of 6 kg/cm² for Part B. The quality of the resulting coated deposit was examined and the results are shown in Table 4. Separately, an identical composition was cast onto the surface of the same brick as above, The quality of the casting is also shown in Table 3.

As is apparent from Table 3, the two-part gunning refractory composition according to the present invention provides a deposit having a quality which is comparable to that obtainable by casting application.

TABLE 3

|  |  | % by weight |  |
|---|---|---|---|
| Coarse/fine grain part (Part A) |  |  |  |
| sintered alumina (6–48 mesh) |  | 57.7 |  |
| silicon carbide (14–200 mesh) |  | 12 |  |
| graphite (pitch treated, at most 1 mm) |  | 3 |  |
| anhydrous sodium metasilicate |  | +0.1 |  |
| water |  | +0.2 |  |
| Slurry part (Part B) |  |  |  |
| silicon carbide (at most 200 mesh) |  | 18 |  |
| calcined alumina (at most 10 μm) |  | 7 |  |
| clay |  | 2 |  |
| boron carbide (at most 200 mesh) |  | 0.3 |  |
| sodium polytetraphosphate |  | +0.1 |  |
| colloidal silica (20% of solid $SiO_2$) |  | +4 |  |
| water |  | +2.5 |  |
| Application technique |  | gunning | Casting |
| Properties of deposit |  |  |  |
| linear change | 110° C. - 24 hrs. | −0.03 | −0.09 |
|  | 1000° C. - 3 hrs. | −0.06 | −0.06 |
|  | 1500° C. - 3 hrs. | −0.06 | −0.03 |
| crushing strength (kg/cm²) | 110° C. - 24 hrs. | 156 | 120 |
|  | 1000° C. - 3 hrs. | 750 | 590 |
|  | 1500° C. - 3 hrs. | 970 | 880 |
| apparent porosity (%) | 110° C. - 24 hrs. | 17.5 | 17.3 |
|  | 1000° C. - 3 hrs. | 19.6 | 19.1 |
|  | 1500° C. - 3 hrs. | 19.4 | 19.2 |
| amount of water employed (%) |  | 6.0 | 6.0 |

EXAMPLE 3

A two-part gunning refractory composition was prepared by mixing the coarse/fine grain components set forth in Table 4 with 0.3% by weight of anhydrous sodium metasilicate as a hardening accelerator to form Part A and by mixing fine/superfine powders as set forth in Table 4 with 0.1% by weight of sodium tetrapolyphosphate as a deflocculant, 3.5% by weight of colloidal silica and 4.0% by weight of water, per 100 weight % of refractory raw material, to form a slurry part (Part B). The resulting two-part compositions were coated by gunning using the same conditions as in Example 2. Separately, casting was also carried out with the same composition except that the slurry (Part B) was not used. The quality of the deposit thus obtained was examined and the results are shown in Table 4.

As is apparent from Table 4, the present example provides the same quality obtainable by casting application.

TABLE 4

| | | % by weight | |
|---|---|---|---|
| Coarse/fine grain part (Part A) | | | |
| burned bauxite (6–48 mesh) | | 62.8 | |
| silicon carbide (at most 48 mesh) | | 5 | |
| pitch pellets | | 2 | |
| high aluminous cement | | 0.2 | |
| anhydrous sodium metasilicate | | +0.3 | |
| Slurry part (Part B) | | | |
| burned bauxite (at most 48 mesh) | | 8 | |
| silicon carbide (at most 200 mesh) | | 10 | |
| calcined alumina | | 9 | |
| silica flour | | 3 | |
| sodium tetrapolyphosphate | | +0.1 | |
| colloidal silica (20% solid SiO$_2$) | | +3.5 | |
| water | | +4 | |
| Application technique | | gunning | casting |
| linear change (%) | 105° C. - 24 hrs. | 0.00 | −0.06 |
| | 1000° C. - 3 hrs. | −0.06 | −0.00 |
| | 1500° C. - 3 hrs. | +0.28 | +0.46 |
| crushing strength | 105° C. - 24 hrs. | 120 | 100 |
| (kg/cm$^3$) | 1000° C. - 3 hrs. | 530 | 490 |
| | 1500° C. - 3 hrs. | 480 | 310 |
| apparent porosity (%) | 105° C. - 24 hrs. | 19.9 | 19.8 |
| | 1000° C. - 3 hrs. | 23.0 | 22.8 |
| | 1500° C. - 3 hrs. | 22.1 | 22.3 |

The two-part gunning refractory composition comprising the coarse/fine grain part (Part A) and slurry part (Part B) according to the present invention can be used for gunning application using gunning equipment comprising a conventional batch-type or continuously operating gun, a slurry tank and a nozzle for gunning by mixing the coarse/fine grain part (Part A) with the slurry part (Part B) at the nozzle. The present invention using the two-part gunning refractory composition can increase the adhesion ratio of applied refractory material and also the packed density of the deposit and thus provides the same quality deposit obtained by casting application.

What is claimed:

1. A two-part gunning refractory composition suitable for lining molten pig iron receiving troughs and vessels comprising, aa a whole, a refractory raw material composed of 84–98 % by weight of refractory aggregate consisting of a coarse/fine grain portion and a fine powder portion, 12–2% by weight of a superfine refractory powder having a particle size of at most 10 μm, a defloculant, one or more of water and colloidal silica, and 4–0% by weight of aluminous cement, the improvement comprising the composition comprising a coarse/fine grain part (Part A) composed of said coarse/fine grain portion of said refractory aggregate which contains 0.05 to 0.5% by weight of a hardening accelerator, per 100 weight % of said refractory raw material, and a slurry part (Part B) separate from said Part A, said Part B comprising the remaining fine powder of the refractory aggregate, the superfine powder, 0.01–0.5% by weight of a deflocculant per 100 weight % of said refractory raw material and 4–10% by weight of one or more of water and colloidal silica capable of being dispersed in water per 100 weight % of said refractory raw material said aluminuous cement being incorporated into at least one of Part A and Part B.

2. The composition according to claim 1 wherein the refractory aggregate comprises a major amount of at least one oxide refractory raw material selected from alumina, alumina magnesia type spinel, high alumina, chamotte, agalmatolite, and silica and a minor amount of at least one non-oxide refractory raw material selected from silicon carbide, silicon nitride, ferro-silicon nitride, carbon, pitch, metallic silicon, metallic aluminum, and boron carbide.

3. The composition according to claim 1 wherein the particle size of said coarse/fine grains of said refractory aggregate is greater than 74 μm.

4. The composition according to claim 1 wherein the Part A to slurry Part B is in the range of 60/40 to 75/25.

5. The composition according to claim 1 wherein the superfine refractory powder comprises at least one substance selected from clay, kaolin, silica flour produced as a by-product of the production of ferro-silicon and meta-silicon, hydrated silica, carbon black, silica produced by a vapor-phase technique, alumina, titanium oxide, and calcined alumina.

6. The composition according to claim 1 wherein the deflocculant comprises at least one substance selected from a formaldehyde adduct of naphathalene sulfonic acid, lignin sulfonate salt, and sodium phosphate.

7. The composition according to claim 1 wherein said hardening accelerator comprises at least one substance selected from sodium sulfate, potassium sulfate, calcium sulfate, sodium nitrate, potassium nitrate, K$_2$CO$_3$, Na$_2$CO$_3$, Li$_2$CO$_3$, sodium silicate, potassium silicate and Ca(OH)$_2$.

8. The composition according to claim 1 wherein said aluminous cement is selected from ALCOA Ca-25, Denka high alumina Cement Super, CECAR 250, J.I.S. No. 1 and No. 2 aluminous cement, and calcium aluminate which is a component of an aluminous cement.

9. A method for lining troughs or vessels for molten pig iron by gunning with a two-part gunning refractory composition comprising, as a whole, a refractory raw material composed of 84–98% by weight of refractory aggregate consisting of a coarse/fine grain portion and a fine powder portion, 12–2% by weight of superfine refractory powder having a particle size of at most 10 μm, a deflocculant, one or more of water and colloidal silica, and 4–0% by weight of aluminous cement, the improvement comprising providing a composition comprising a coarse/fine grain part (Part A) composed of said coarse/fine grain portion of said refractory aggregate which contains 0.05 to 0.5% by weight of a hardening accelerator, per 100 weight % of said refractory raw material, and providing a slurry part (Part B) comprising the remaining fine powder of the refractory aggregate, the superfine powder, 0.01–0.05% by weight of a deflocculant per 100 weight % of said refractory raw material and 4–10% by weight of one or more of water and colloidal silica per 100 weight % of said refractory raw material said aluminous cement being incorporated into at least one of Part A and Part B, adding the Part A and Part B at a nozzle of a spraying gun to line the resultant mixture on the inner surface of the trough or vessel.

10. The composition according to claim 3 wherein the particle size of said coarse/fine grains of said refractory aggregate is 0.3–5 mm.

11. The composition according to claim 1 wherein the superfine refractory powder has a particle size of at most 1 μm.

12. A two-part gunning refractory composition suitable for lining molten pig iron receiving troughs and vessels comprising:
(i) coarse/fine grains containing 0.05 to 0.5% by weight of a hardening accelerator per 100 weight percent of the refractory composition;
(ii) a slurry comprising a fine powder, 12-2% by weight of a superfine refractory powder having a particle size of at most 10 μm, 0.01-5% by weight of a deflocculant and 4-10% by weight of one or more of water and colloidal silica capable of being dispersed in water, there further being 4-0% by weight of aluminous cement incorporated into at least one of (i) and (ii); and
wherein the amount of the coarse/fine grains and the fine powder together is 84-98% and wherein components (i) and (ii) are separate.

* * * * *